United States Patent
LaCalle Bayo et al.

(10) Patent No.: US 9,945,140 B2
(45) Date of Patent: Apr. 17, 2018

(54) FLOOR AND WALL CLEANER

(71) Applicant: Ingeneria Y Marketing, S.A., Valencia (ES)

(72) Inventors: Jesús LaCalle Bayo, Valencia (ES); Juan Ignacio Vaquer Perez, Valencia (ES); José Ignacio Rosello Garcia, Valencia (ES)

(73) Assignee: Ingenieria y Marketing, S.A., Valencia (ES)

( * ) Notice: Subject to any disclaimer, the term of this patent is extended or adjusted under 35 U.S.C. 154(b) by 0 days.

(21) Appl. No.: 15/314,567

(22) PCT Filed: May 30, 2014

(86) PCT No.: PCT/ES2014/070448
§ 371 (c)(1),
(2) Date: Nov. 29, 2016

(87) PCT Pub. No.: WO2015/181406
PCT Pub. Date: Dec. 3, 2015

(65) Prior Publication Data
US 2017/0114560 A1    Apr. 27, 2017

(51) Int. Cl.
*E04H 4/16* (2006.01)
*G21F 9/00* (2006.01)
*G21C 19/20* (2006.01)

(52) U.S. Cl.
CPC ......... *E04H 4/1654* (2013.01); *G21C 19/207* (2013.01); *G21F 9/00* (2013.01)

(58) Field of Classification Search
CPC ... E04H 4/1654; E04H 4/1663; E04H 4/1636; G21C 19/207; G21C 17/013;
(Continued)

(56) References Cited

U.S. PATENT DOCUMENTS 4,154,680 A    5/1979   Sommer
4,304,022 A    12/1981  Sommer
(Continued)

FOREIGN PATENT DOCUMENTS

EP    0905334 A1    3/1999
EP    1002173 B1    5/2000
(Continued)

OTHER PUBLICATIONS

Electric Robot Cleaner, Sweepy M3, found at http://acquasource.gr/detail_asp?qu_prod=419&qu_categ=4&qu_sub=53, 2016.
(Continued)

*Primary Examiner* — Dung Van Nguyen
(74) *Attorney, Agent, or Firm* — Richard M. Goldberg

(57) ABSTRACT

A cleaner includes an external casing forming a suction hood, an upper suction mouth, the casing also being provided with a drive arranged on each side and equipped with independent motors and corresponding transmission mechanisms on each side, and cleaning rollers; sets of internal cleaning rollers disposed close to the center of the hollow interior of the casing and having a width approximately equal to the distance between the side elements of the casing; sets of external cleaning rollers located close to the front and rear edges of the casing of the cleaning device and having a total width slightly greater than the width of the casing; a resilient joint at the support for the external rollers; a pair of adhesion turbines; auxiliary drive wheels on the internal cleaning rollers; a flotation body connected to the casing and having a fixed and/or variable volume; and laterally mobile turbines.

26 Claims, 11 Drawing Sheets

(58) Field of Classification Search
CPC .......... G21C 19/07; G21C 19/00; G21F 9/00; A47L 11/34; A47L 11/4044; A47L 11/4088
See application file for complete search history.

(56) References Cited

U.S. PATENT DOCUMENTS

| | | | | |
|---|---|---|---|---|
| 5,842,243 | A * | 12/1998 | Horvath | E04H 4/1636 15/1.7 |
| 6,115,864 | A * | 9/2000 | Davidsson | E04H 4/1654 15/1.7 |
| 6,842,931 | B2 * | 1/2005 | Porat | E04H 4/1654 15/1.7 |
| 6,965,814 | B2 * | 11/2005 | Hadari | E04H 4/1654 15/1.7 |
| 7,118,632 | B2 * | 10/2006 | Sumonthee | E04H 4/1654 134/6 |
| 2012/0006352 | A1 * | 1/2012 | Holappa | B08B 1/008 134/6 |
| 2012/0102664 | A1 | 5/2012 | Hui et al. | |
| 2013/0061407 | A1 * | 3/2013 | Ben-Dov | E04H 4/1654 15/1.7 |
| 2014/0076789 | A1 * | 3/2014 | Shlomi-Shlomi | E04H 4/1654 210/195.1 |
| 2014/0246050 | A1 * | 9/2014 | Klintberg | G21C 17/01 134/6 |
| 2016/0145884 | A1 * | 5/2016 | Erlich | E04H 4/1654 15/1.7 |

FOREIGN PATENT DOCUMENTS

| | | |
|---|---|---|
| EP | 1472425 B1 | 6/2011 |
| WO | 2013/030005 A1 | 3/2013 |

OTHER PUBLICATIONS

Weda N600, found at http://weda.se/industry/n600/, 2016.
ATOX underwater bottom cleaner, found at http://www.atox.co.jp/english/technique/inspection/, 2016.

* cited by examiner

FLOOR AND WALL CLEANER

BACKGROUND OF THE INVENTION

This invention refers to a floor and wall cleaner specially designed to be used in critical areas with difficult accessibility or restricted access, such as pools for housing a reactor vessel at a nuclear power station, in which human presence must be avoided as far as possible and, should this be necessary, this must be for the shortest possible time.

According to the invention, the floor cleaner comprises:
A casing or housing provided with a suction mouth;
Drive belts on each side, driven by respective motors;
Inner rollers, provided with mutually independent drive media;
A set of outer rollers with permanent opposite rotation;
At least one elastic hinge of at least one axle carrying the rollers;
Gear motor assemblies for the roller movement
A set of sealed connections and a first control body;
Lighting systems;
At least one camera for taking pictures;
A float or buoy of variable volume;
A set of turbines for gripping the wall;
A set of turbines with lateral movement; and
An anchorage for holding the float or buoy to the body of the casing or housing.

The pools in which the reactor of a nuclear power station is housed are made up of a cubicle which may be in a regular or irregular shape and have dimensions that can range from one or two dozen meters on the smallest horizontal side to several dozen meters on the larger side, with a height of several meters, able to temporarily house a large number of the components of the reactor in the dismantling stage.

The base of the pools tends to be of irregular shape. On one hand there are small-sized recesses which have to be cleaned preferably before emptying the pool, as these could contain radioactive material, and there are also uneven parts of the floor, amongst other reasons due to the bolts for holding the vessel of the reactor.

This thus requires a device for cleaning the floors of the pools in which reactors of nuclear power stations are housed which is able to clean narrow spaces, to the maximum width of the apparatus and which is able to get over any small obstacles which it might come up against.

As well as the floors, particles are deposited on the walls of these pools. Conventional devices are not nevertheless able to clean the walls, as if they did so it would be the suction force of the absorption system which would have to keep the device attached to the wall. Since these devices have to be made as far as possible of stainless steel or some other material able to be decontaminated, they have a high minimum weight, and the absorption systems conventionally used are not able to maintain their grip. Furthermore, even when the absorption capacity is enough to maintain a grip, any irregularity or space would cause loss of adherence, and the device would fall to the floor and have to be positioned again. Since the positioning task is extremely delicate, this risk in an installation of this sort makes such a system inoperative.

STATE OF THE ART

There are different types of floor cleaners. First of all there are manual cleaners, which have a rod with which the cleaning head is moved; this head is connected by means of a suction hose to a pump and normally to a filter to be returned to the pool. This type of cleaner cannot be used in the vessel of a nuclear reactor due to several problems:

The floor tends to be located more than ten meters below the surface and there is an even greater distance to the accessible upper edge;
The pool may not have an upper perimeter strip from which the rod can be handled;
The visibility of the floor from the height at which this must be handled is very limited or none at all.
This requires a person to be handling the rod, which is not feasible through the height at which this is handled, the lack of visibility and the dose of radiation that the person in question would receive.

EP 1472425 describes an independent floor cleaner for pools which comprises a set of support wheels and is provided with filtration and pumping means. It does not have means of controlling the movement at will.

EP 1002173 discloses a floor cleaner with movement induced by a suction flow from an exterior pump; like the previous one this does not have any means for controlling its movement.

A robot device known on the market as "ZODIAC Sweepy M3", comprises a pair of lateral drive chains driven by motors and also comprises a motor for pumping water through a filter. The cleaning width is nevertheless interior, between the drive chains, for which reason it ends far from the outer edges. Furthermore, since this is conceived for cleaning swimming pools, it is not designed to get over obstacles.

In the nuclear industry, the "WEDA N600" device is also a compact device able to be handled in remote control or in automatic mode, which has, like the previous one, a pair of drive chains, in this case with front and rear brushes of a width roughly equal to that of the body of the device and in which the extraction system installed in the apparatus itself expels the water through filter bags.

The "ATOX underwater bottom cleaner" device has a structure similar to the previous ones, in that this is provided with lateral drive chains, with a filtration body operated with an exterior pump. One major disadvantage of this device is its weight, apart from the difficulties of cleaning the side zones, for the reasons given above.

Other devices, even whilst complying with some of the characteristics described in the devices mentioned, are machines with a greater size, weight, cost and with the disadvantages also described above, without the manoeuvring capacity which is intended to be solved with this invention.

Furthermore, any of these can be held up by a small obstacle, such as a bolt head two or three centimeters high, when said obstacle is not directly confronted by one of the drive chains.

There are light swimming pool cleaners made of plastic materials which are able to go up the walls of pleasure swimming pools, but which are not usable in the pool of a nuclear power plant reactor for the reasons stated above, since plastic is not an acceptable material for said use, and neither do they have devices for controlling their movement.

None of said devices is able to efficiently clean the walls of the vessel of a nuclear power plant reactor in a controlled manner.

It is furthermore desirable for the same apparatus which is able to clean the walls to be able to clean the floor. This has advantages in the cost of the device, since instead of two (one for the walls and one for the floor) one will be enough and the operations can be performed consecutively with no need to perform two decontamination processes; one of these is enough at the end of both operations, for cleaning the floor and the walls.

It is furthermore desirable for the same apparatus to be suitable for cleaning sloping surfaces.

SUMMARY OF THE INVENTION

The invention being proposed consists of a floor cleaner which comprises a structure carrying the other items, which are as follows:

- A front roller; the front roller is held on a central support, securely held in turn to one of the side elements forming said structure; this roller is elastically hinged to said central support; it is divided into two halves or bodies, each of these being on one side of the central support;
- A rear roller, essentially identical to the front roller;
- A front central roller, preferably the front roller and the front central roller should be driven by a single motor, but they could also be driven by means of separate motors;
- A rear central roller; the rear roller and the rear central roller should preferably be driven by a single motor, but they could also be driven by means of separate motors;
- A suction bell placed on the casing, with an upper intake (on the side opposite that of the support for the rollers) and a linear suction mouth which is placed between the central rollers;
- Two sets of drive wheels or belts, one on each side, in which each set of drive wheels or belts is driven by an independent motor; it is preferable for the movement to take place by means of belts, as the possibility of the device being held up on an obstacle, such as a bolt head, is lower if this option is used. The pulling takes place by means of independent motors, with variable speed and rotation direction, meaning that, depending on the rotation direction of the motors, the cleaner can move forward when both belts rotate at the same speed in one direction, move in reverse when they rotate inversely in respect of the above or with displacement when the speeds of the belts are different.

For proper cleaning of the floor, there are central interior rollers and front and rear exterior rollers. In particular, according to the preferred embodiment, two interior rollers are used, with the suction bell between them, and two exterior rollers, each of these, the front and rear ones, being placed on a hinged support in a normally central position. The interior rollers have a smaller size than the width of the cleaner, insofar as these are driven from at least one of their sides and between the drive system. The outer rollers are divided into two portions, and driven from the centre, so that the free end of each side reaches the maximum width of the cleaner; in particular the length of the rollers is slightly greater than the width of the cleaner casing.

The rollers are made up of a core and a sheath. It has been found that an ideal sheathing for proper cleaning is made up of rubber strips, arranged radially (in a transversal direction to the movement). Hence, at least some of the strips will have to be positioned radially in respect of the roller axis. These transversal strips may be joined to strips arranged on a plane perpendicular to the axle of the roller without impeding their operation.

In normal operation, with no obstacles, the exterior rollers and interior rollers turn in a direction so as to move the dirt towards the interior of the suction bell, that is, they drag the dirt along the floor towards the interior of the suction bell. The displacement is caused by the drive belts. The movement of the front belts and of the rear belts in this normal operation will be in mutually opposite rotation directions; however, when they come up against an obstacle, one of the rollers may possibly have a support which exerts significant force, so that the movement inverse to its displacement could block the floor cleaner, without the drive belts having sufficient support. For this reason, since the front rollers and the rear rollers are driven by independent motors, in the event of their coming up against an obstacle, such as a bolt head or a drop or rise in level of some centimeters, all the rollers may be made to run in forward motion, that is, in the same rotation direction as the wheels or drive belts, which helps to get over the obstacle in question.

The movement of the rollers is separate from the displacement movement of the cleaner, and is driven by two independent motors, as has already been said. The control device can nevertheless synchronise the motors for optimum operation.

For the movement of the rollers and the drive belts, there are respectively motors and mechanical transmission assemblies, each formed of a plurality of pinions engaging each other.

As has already been stated, the exterior rollers are driven from the central part; this central drive is made up of an arm or support which houses a mechanism, and sustains the corresponding parts of the lateral roller projecting outward, up to a width slightly over that of the casing. This means that the exterior rollers do not properly clean a central zone in which the support and the drive mechanism for the front and rear rollers are located, which is why this zone has to be cleaned by the interior rollers. The sheath of the interior rollers must thus be continuous on the longitudinal plane on which the mechanism for driving the exterior rollers is located, especially the front rollers.

Throughout the cleaning process different obstacles may come up, such as screw heads, bolt covers, etc. These obstacles do not tend to be over 2 or 3 cm in height but no compact conventional system is able to overcome these without getting jammed. If the arm carrying the front or rear rollers were rigidly fixed to with the housing of the cleaner, this would make it jam, since on rising up the obstacle, it also undesirably raises the drive belts, and the device loses traction. For this reason it has been designed for both the front arm and the rear arm to have a hinged support, and be subject to an elastic retaining tension, so that the elevation tension is lower than the cleaner's effective weight in the water and so that when an obstacle is reached said arm rises over the obstacle and the cleaner continues its travel and after the obstacle is reached by the drive belts, these are indeed able to get over this with no further problems, the arm returning to the normal working position when the elastic tension caused on reaching the obstacle has been released.

Sometimes small obstacles are nevertheless located in the centre of the cleaner and are not reached by the drive belts. To solve this drawback, at least one of the rollers, and in particular all of these, have been provided with a set of wheels joined to their axle, so that when the cleaner comes up against an obstacle, these wheels continue to pull. The wheels have a smaller diameter than that of the corresponding brush, so that they will not have contact with the floor unless an obstacle with sufficient height is found. This guarantees that the cleaning is correct in routes with no obstacles. Since the rollers are driven by independent motors, two by two (one for the front ones and one for the rear ones) when an obstacle is reached which holds up the floor cleaner, all the rollers will rotate in the same direction, the wheels of said rollers thus pressing on the obstacle and easily getting over this.

According to a less preferred option for embodiment, the wheels of one of the rollers can be freely rotating, independently of the roller movement.

The alignment of the support wheels of the interior rollers with the position of the arm holding the mechanism for driving the exterior rollers should be avoided, insofar as said exterior rollers do not reach the position of said supporting arm.

The suction head is placed held on the cover of the structure, and comprises an upper suction mouth which is connected to a suction pump, either directly or through a conduit; if this is joined to a conduit, a connector is provided, freely rotating at both ends and in a central zone also at 45°, allowing the positioning of the conduit with no restriction both from the upper head and from any lateral position.

The structure is made up of lateral elements and means of joining said elements; it also comprises an upper cover holding the suction head, and protectors or covers at the front and rear, essentially symmetrical except for the holes for the corresponding connectors. The structure is closed at the front and rear by the corresponding rollers. According to one option each of the lateral elements is formed of a pair of separate parallel plates which define a chamber housing mechanical transmission and possibly drive assemblies.

Even when a turbine has been used for the cleaner to grip the floor in embodiments prior to this invention, this is insufficient. Furthermore, since the suction bell is in a central position, a turbine has to be displaced from said centre, and although this is not critical in cleaning floors, it causes unwanted imbalances when this has to clean walls, which could make the cleaner fall to the floor, requiring further repositioning. The floor and wall cleaner of the invention is thus provided with at least a pair of turbines, which may run simultaneously or independently. The use of turbines for adherence placed symmetrically in respect of the longitudinal and/or transversal central plane has been shown to have a satisfactory result, which cannot be achieved with a single one.

Since the device may be used in a dark zone, such as the pool of reactor vessel at a nuclear power plant, the cleaner is designed to have lighting means, at least in the forward motion direction, but possibly also for reverse movement.

It is also designed for this to have at least one camera and possible two, one at the front and one at the rear, so that the state of cleaning achieved can be known at all times as well as the directions to be taken.

One of the problems for keeping the cleaner on a wall is the weight of the device. As already stated, plastic materials cannot be used in operations in radioactive zones, for which reason the cleaner has a significant weight, of several dozen kilograms.

For this reason the casing has been provided on both sides with two supports for joining this to a float. The float has the aim of compensating part of the cleaner's weight. In particular, it has been designed to have a pair of supports on each side, so that when only walls have to be cleaned, the alignment of the float is roughly over the centre of gravity of the cleaner. When this has to clean sloping surfaces the anchorage could nevertheless be hinged, or arranged in any other position.

The float comprises a normally prismatic sealed body, with a fixed volume, when the apparatus is operating. This sealed body can also comprise an inflatable interior membrane. It is designed to have inlet/outlet valves for cleaning or ballast, normally with water, when the volume required for the specific application is lower than the total volume of the chamber. This float exerts an upward force of from 40% to 90% of the weight of the cleaner, according to the design specifications, apart from overcoming its own weight. Furthermore, to regulate proper operation of the ascending and descending operations it has also been designed for the body to be provided with a second chamber fitted with an inflatable membrane, with a variable body which totally neutralises the weight of the body or even which makes this float. This second chamber is made with perforated sheet metal, so that when the membrane inflates, any water found inside said second chamber can easily be drained out.

The cleaner comprises an electronic control system. The electronic control system determines the actions of speeds and movement directions of each of the motors for driving the displacement or movement of the rollers and the turbine, of the lighting and picture-taking elements, or indicates any fault which might arise in the device. The electronic system comprises a sealed connection plate for connecting electric supply and control cables of the device.

The control body is placed outside the device, and joined to this by means of supply cables for the different elements, insofar as it been shown that the radiation received in the pool quickly disables some of the functions. The governing system is normally placed in a remote control unit, which is normally a computer. This could possibly have an intermediate unit, for example a float which minimises the requirements of control cable sections, when the distances are too long, and which also enables control by means of wireless means.

BRIEF DESCRIPTION OF THE DRAWINGS

In order to illustrate the following explanation, ten sheets of drawings are attached to this descriptive report, representing the essence of this invention in eleven figures, and in which.

Figure 1:
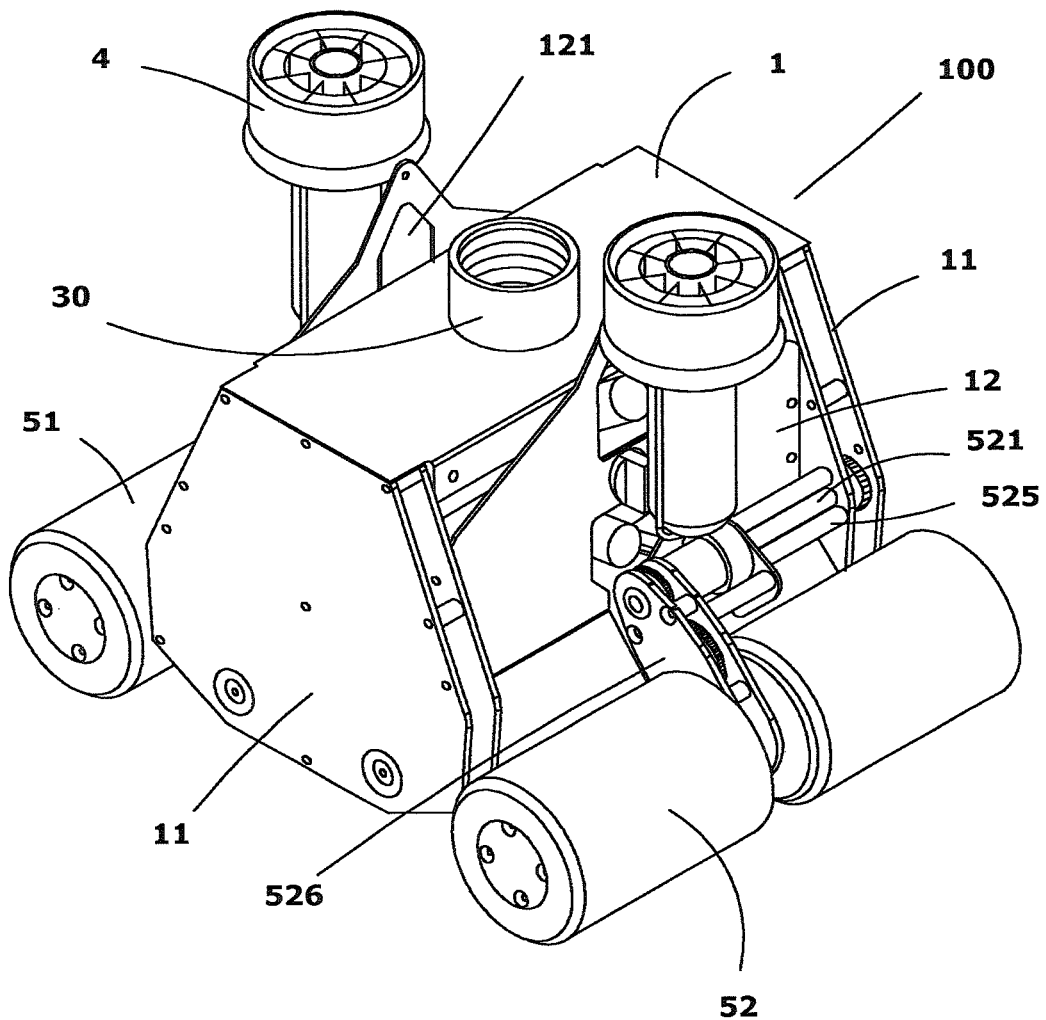
FIG. 1 shows a general schematic view in perspective of the floor and wall cleaner of the invention, not including the float.
Figure 2:
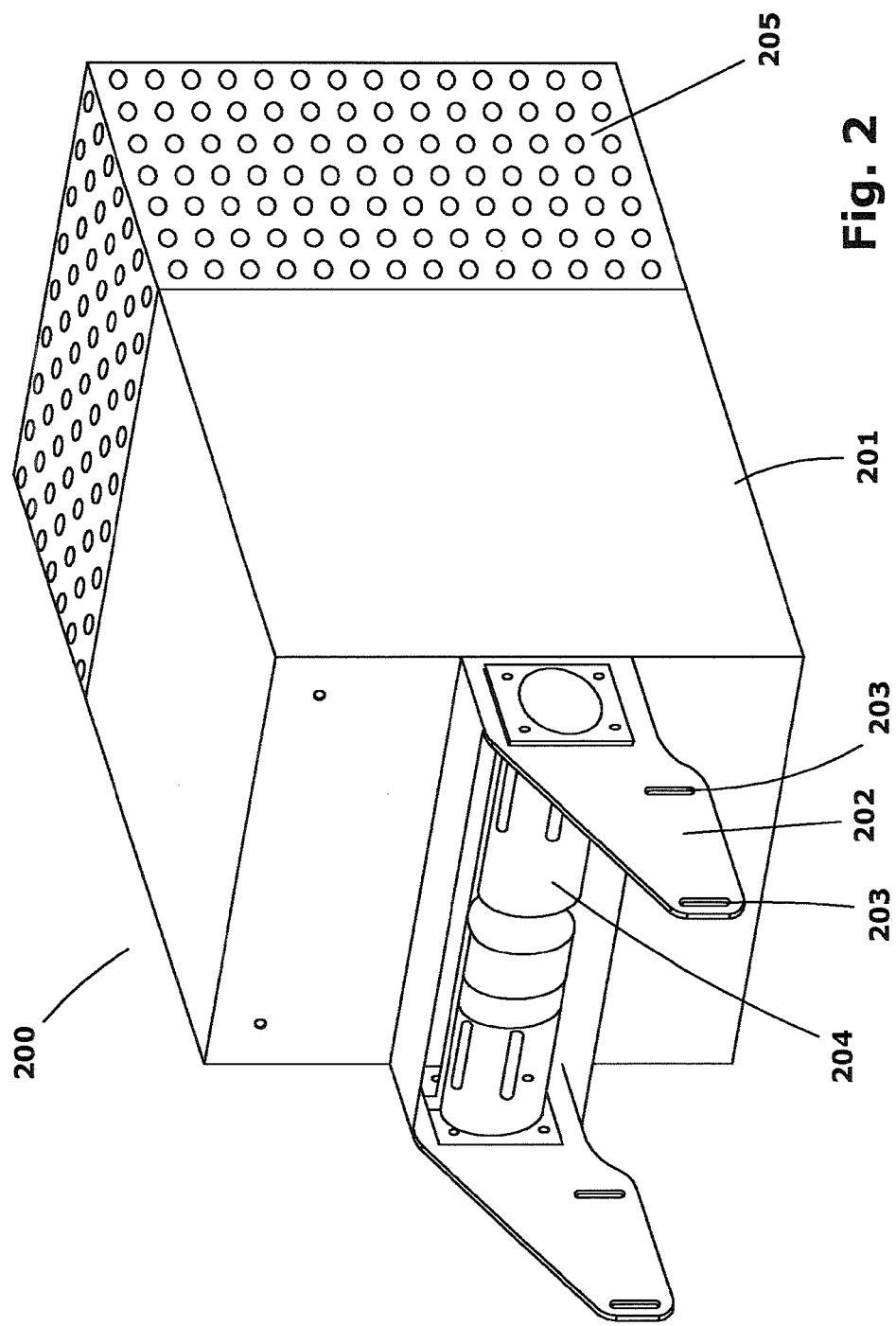
FIG. 2 shows a general schematic view in perspective of a float able to be connected to the floor and wall cleaner of the invention.
Figure 3:
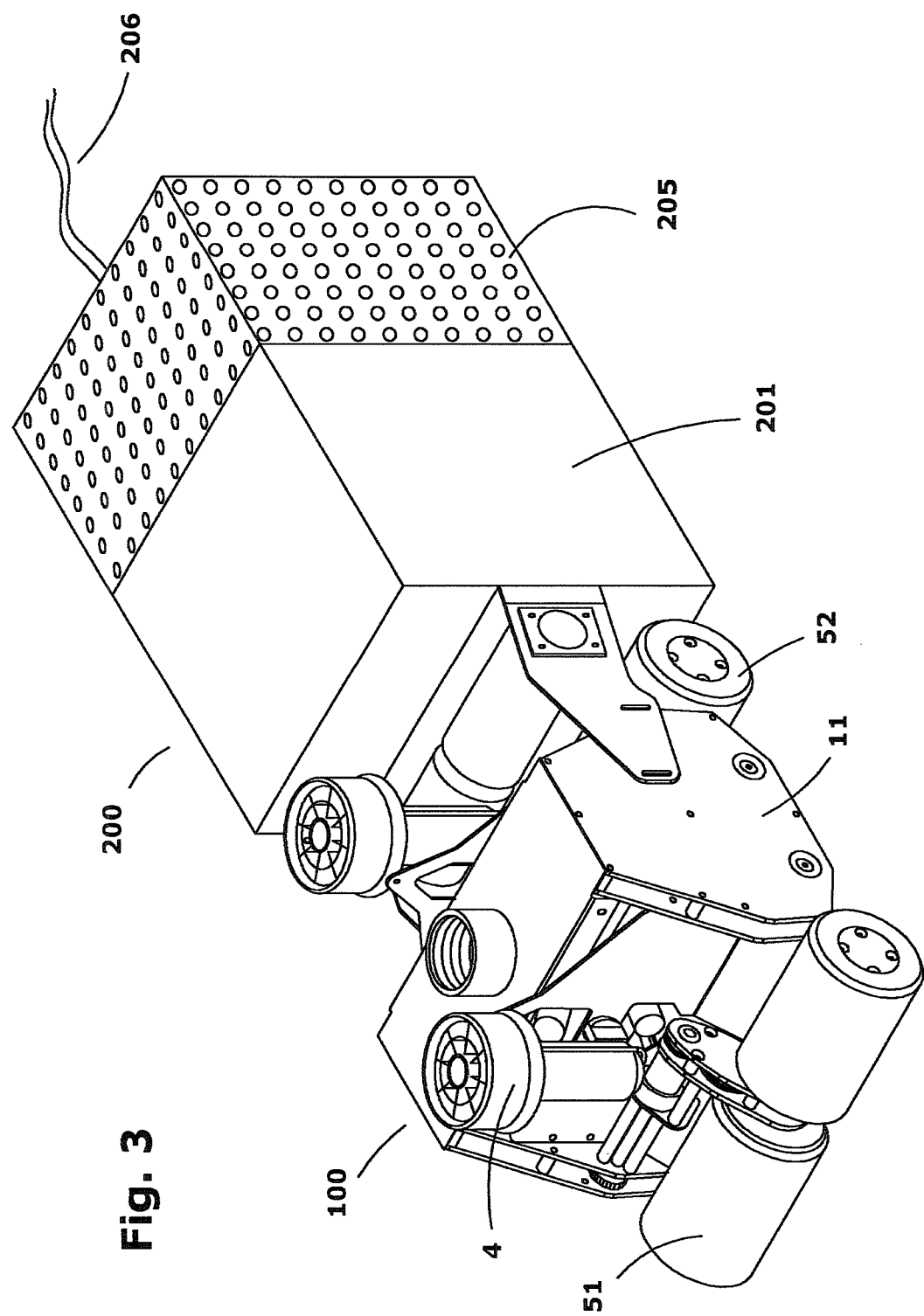
FIG. 3 shows a general schematic view in perspective of the floor and wall cleaner assembly of FIG. 1 with the float of FIG. 2.

The following reference numbers are used in said figures:
1 upper cover
4 gripping turbines
8 turbine or autonomous external suction pump
11 lateral elements
12 front and rear covers
30 suction mouth or nozzle
51 front exterior cleaning roller
52 rear exterior cleaning roller
53 front interior cleaning roller
54 rear interior cleaning roller
55 traction device
56 roller sheathing
100 drive and cleaning body
121 engagement opening
150 suction bell
151 rectangular section of the suction bell
200 floatation body
201 casing or housing of the floatation body
202 coupling arms of the floatation body
203 securing holes of the coupling arms
204 lateral turbines of the floatation body
205 second variable volume chamber
206 connection of the second chamber
210 scraper
211 soft strip
212 sustaining part
521 pivot axis of the exterior arms
525 support of the exterior rollers
526 hinged arm of the support of the exterior rollers
527 spring of the hinged arm
538 core of the interior roller
539 support wheels of the rollers
551 pulleys of the drive device
552 drive belt
558 transmission items
559 drive motor
561 lamellae of the roller housing

DESCRIPTION OF THE FORMS OF EMBODIMENT OF THE INVENTION

The invention being proposed consists, as stated in the heading, of a floor and wall cleaner, governed by remote control, suitable for use in cleaning the floors and walls of the pools housing the vessel of nuclear power stations.

This is made up of a drive and cleaning body (100) and a floatation body (200).

The drive and cleaning body (100) is mainly made up of components of stainless steel and comprises the following elements:

Lateral elements (11), joined together to form a structure; according to a preferred embodiment the lateral elements (11) are made up of a double wall on each of their sides, inside which transmission elements (558) are housed;

An upper cover (1) provided with a suction mouth (30);

Front and rear covers (12); at least one of these will normally be provided with an engagement opening (121), made in the end emerging over the upper cover (1);

A traction device (55); the traction device is made up of at least one drive motor (559) with adjustable speed on each side of the drive and cleaning body (100); normally each of the sides will have a gear motor mechanism for distributing the movement to a pair of pulleys (551), one front and one rear, which sustain and move a drive belt (552) or band or chain. The drive motors (559) as well as the transmission mechanisms are independent on each of the sides and are governed by a control system which could determine whether one or both move, the speed of the movement and the rotation direction, so as to enable the following states:

The cleaner is at rest, when the motors (559) are idle

Figure 4:
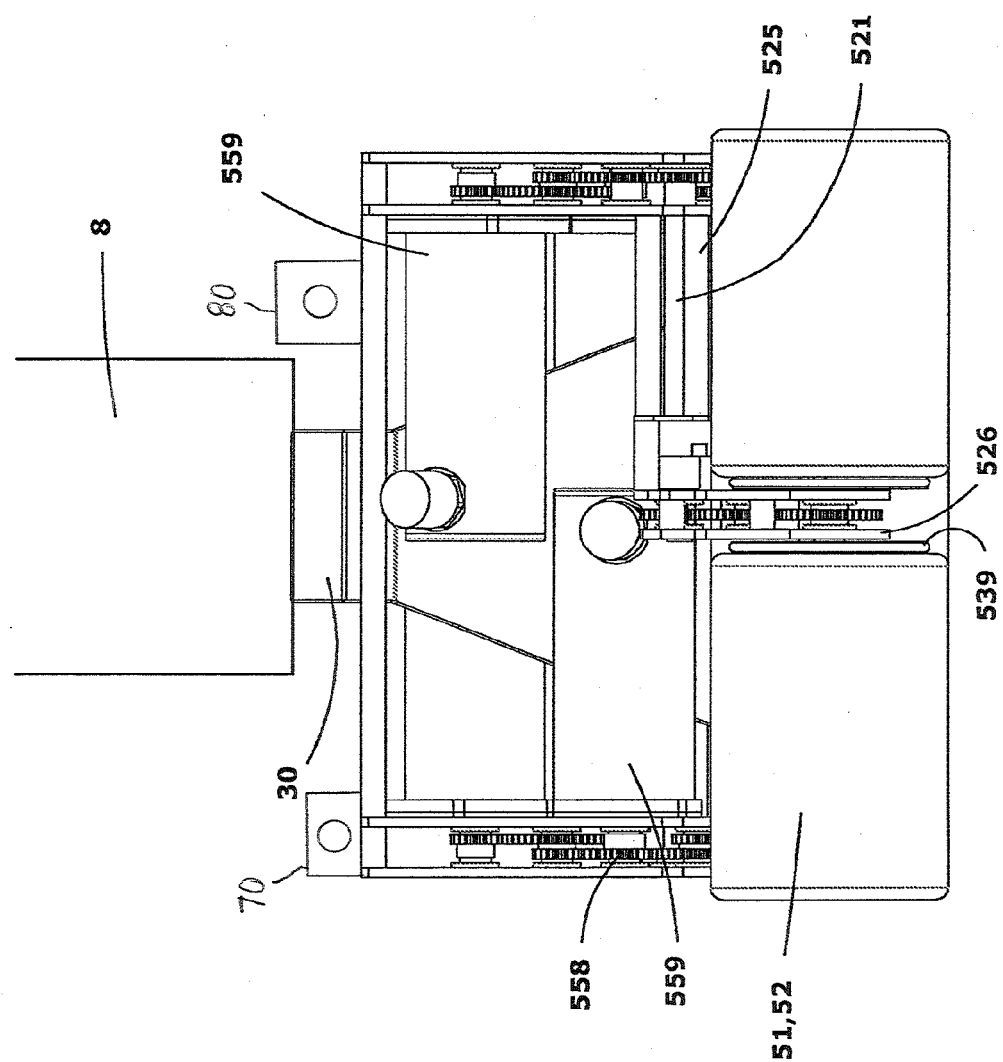
FIG. 4 shows a schematic front view of the floor and wall cleaner of the invention not including the float.
Figure 5:
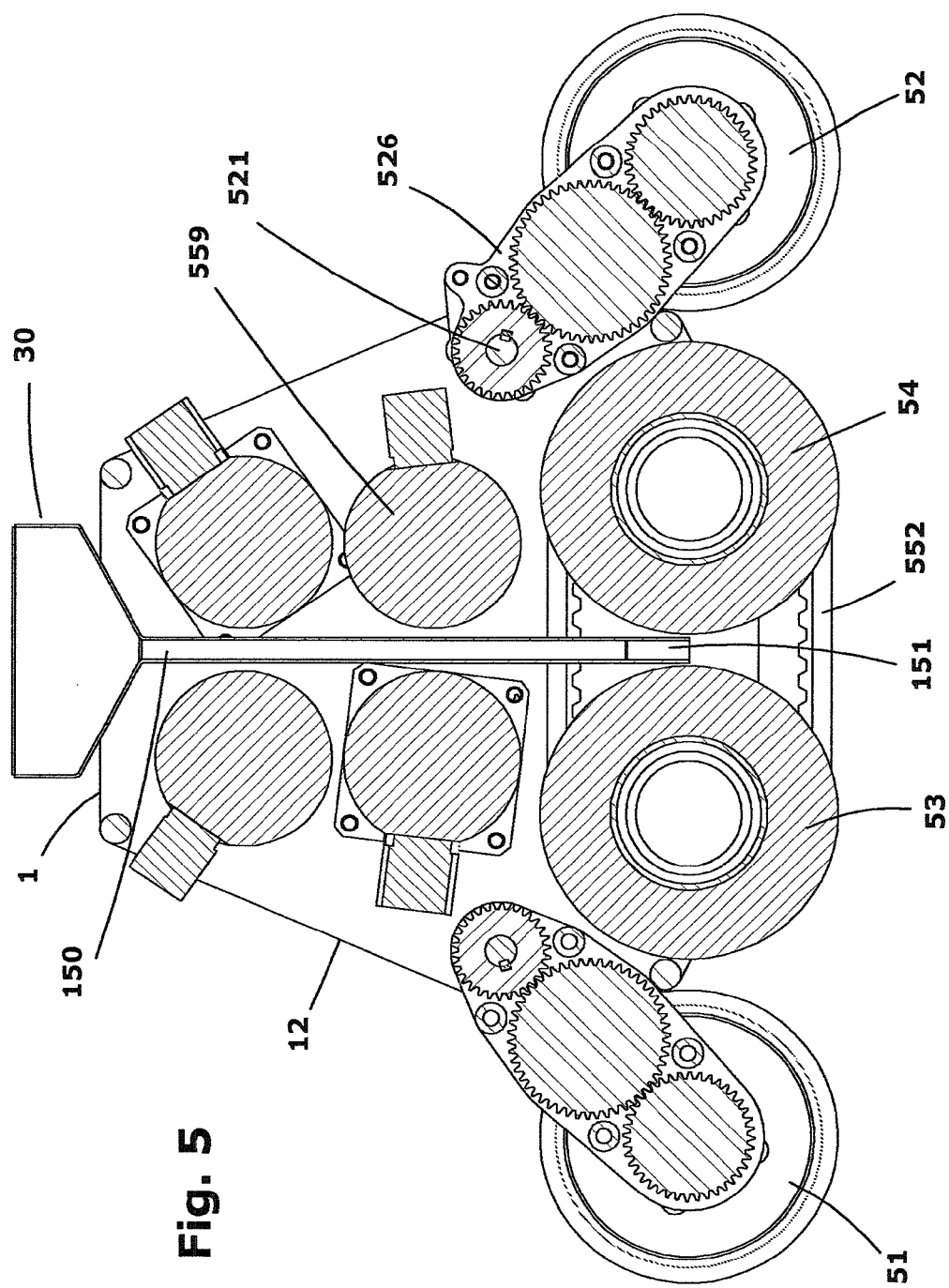
FIG. 5 shows a schematic view along a central longitudinal section of the floor and wall cleaner of the invention not including the float.
Figure 6:
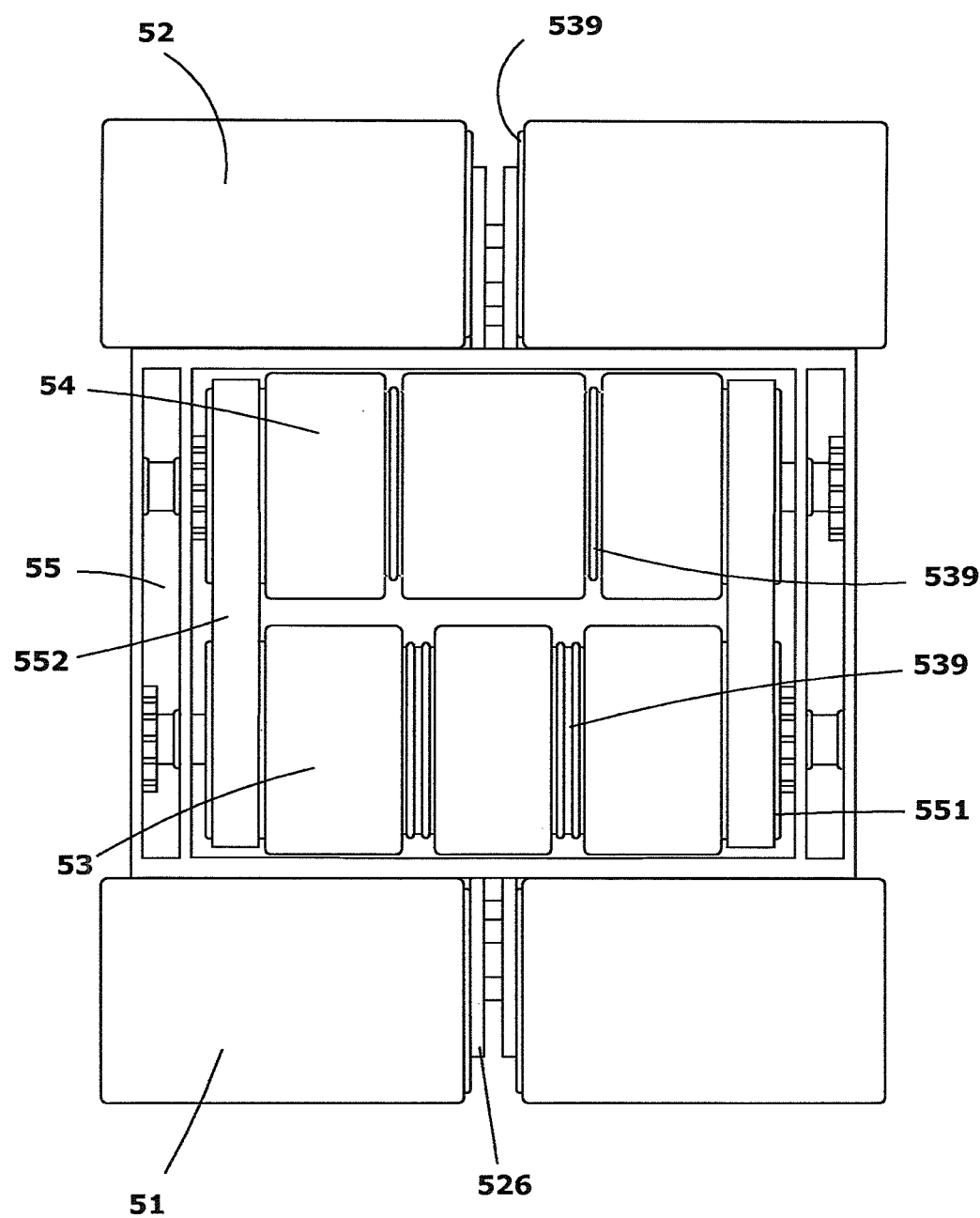
FIG. 6 shows a schematic lower view of the floor and wall cleaner of the invention, not including the float.
Figure 7:
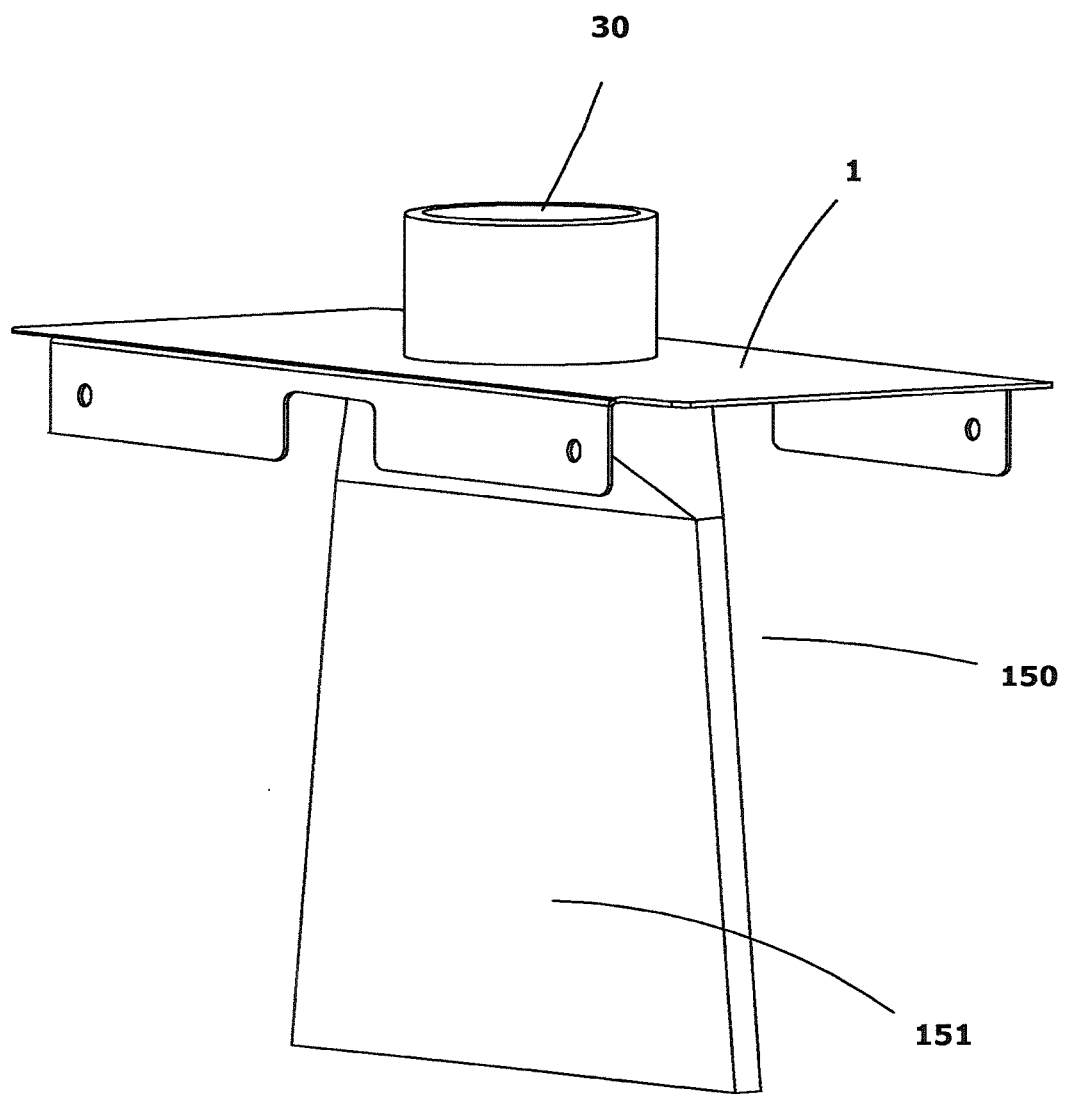
FIG. 7 shows a schematic view in perspective of the suction bell which is fitted in the cleaner.
Figure 8:
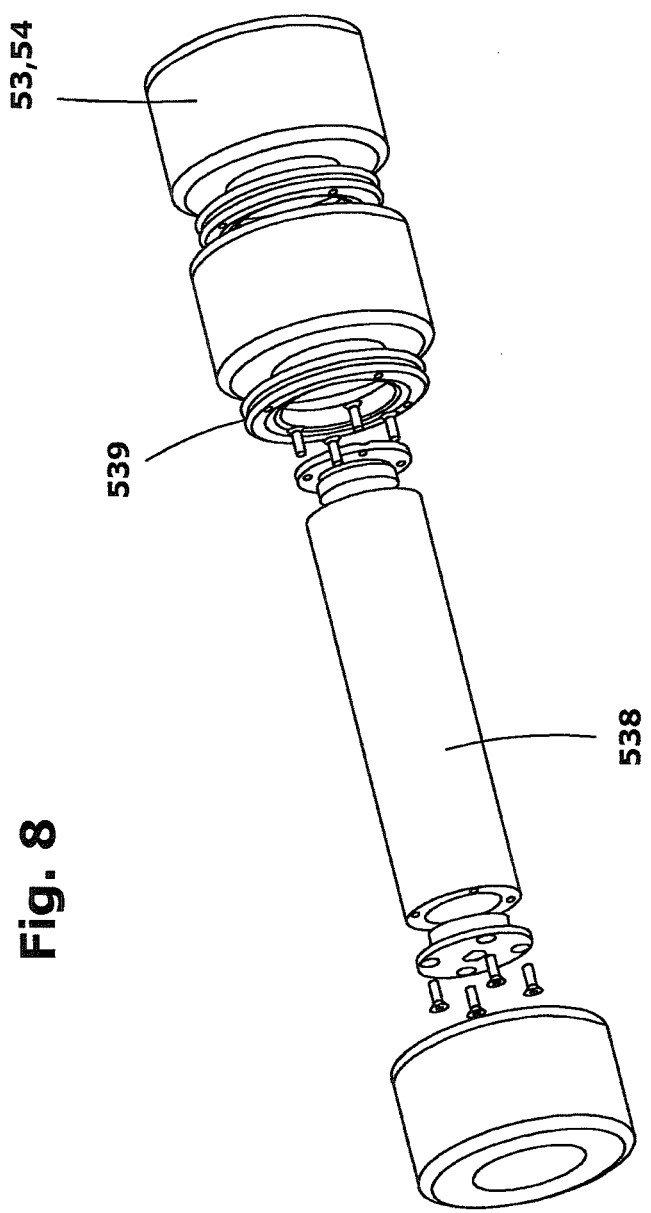
FIG. 8 shows a schematic exploded view of an example of an embodiment of one of the interior rollers.
Figure 9:
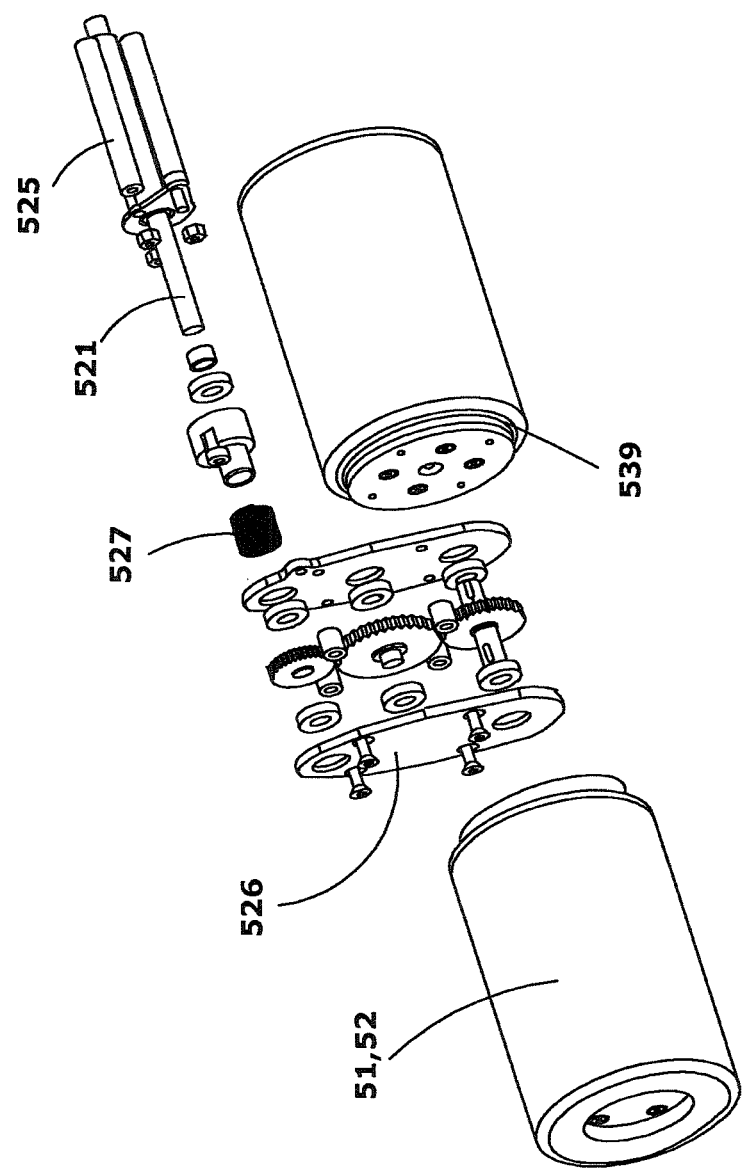
FIG. 9 shows a schematic exploded view of an example of one of the exterior rollers, with a body for securing to the chassis and an elastically hinged arm for holding said rollers.
Figure 10:
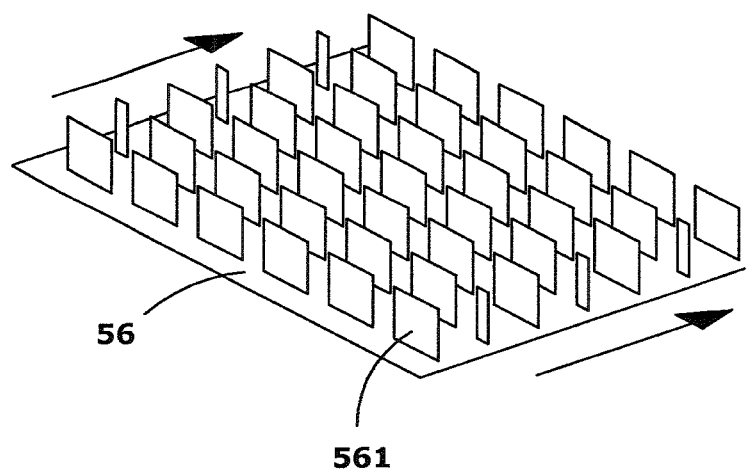
FIG. 10 shows a schematic view in perspective of the flat development of one form of covering the rollers.
Figure 11:
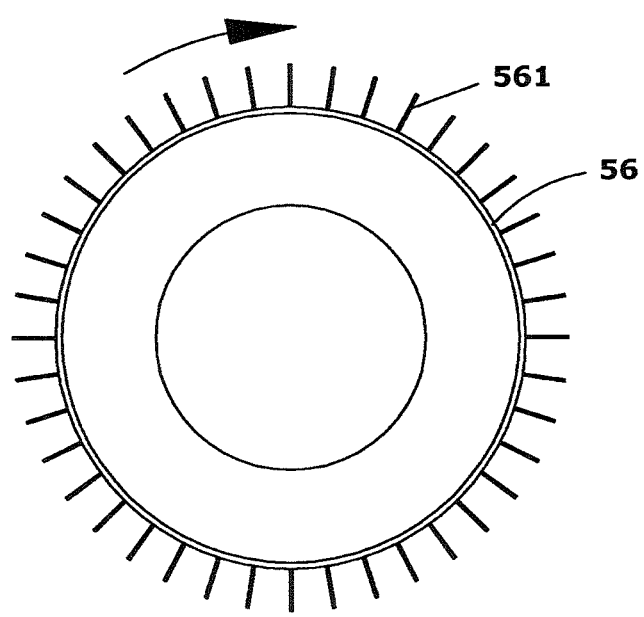
FIG. 11 shows a section view of a cleaning roller provided with the sheathing of FIG. 10.
Figure 12:
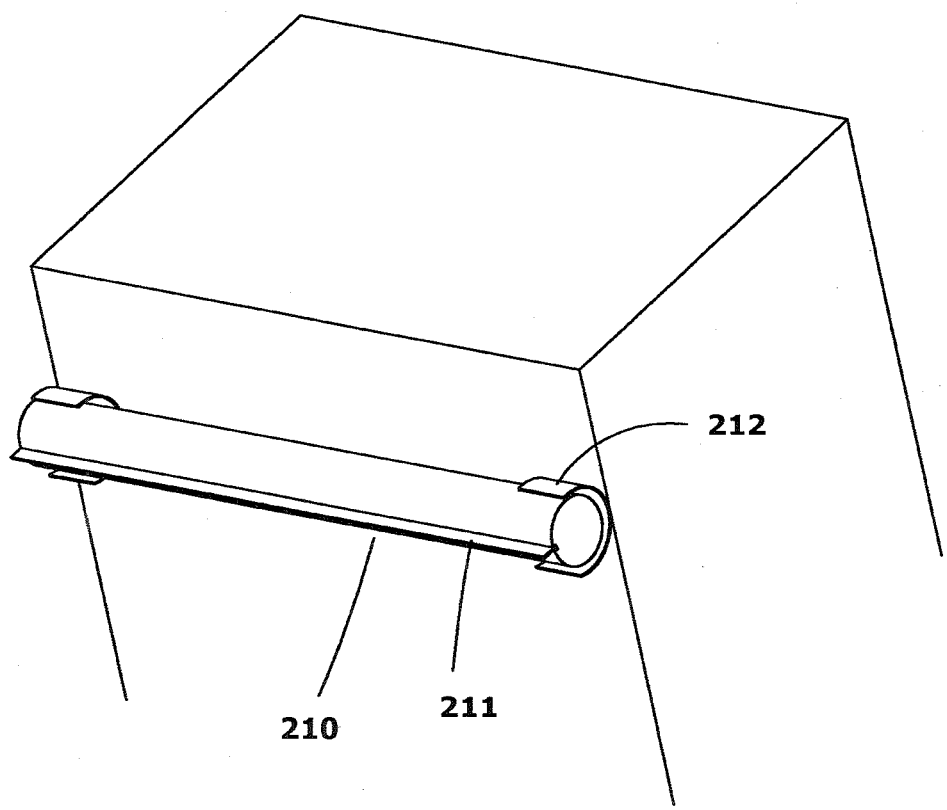
FIG. 12 shows a schematic view in perspective of a scraper fitted on the float.

The cleaner moves in a forward direction, with a variable speed depending on the rotation speed of the motors (559), synchronized by the control body;

The cleaner will rotate, by inverting the rotation direction of the motors (559) for a static rotation, or by variation of the speed of one of the motors in respect of the other, when the rotation takes place while moving;

Hence, an axle moved by the drive motor (559) transmits the rotation movement to each of the sides, and a mechanical system of gears (transmission elements 558) transmits this to at least one of a pair of pulleys (551) or drive crown wheels set on the corresponding side; the movement is preferably transmitted to the two front and rear pulleys or crown wheels on each of the sides; the belt (552) may have a toothed interior matching the outside of the pulleys (551), so as to guarantee absolute control of the movement with no unwanted sliding;

A set of cleaning rollers (51,52,53,54), the rollers are made up of a core (538) and a sheath (56); the sheath is made of an elastic material, such as rubber, formed of or comprising in its outer surface at least one set of tabs or lamellae (561) arranged in a radial position, i.e. transversal in respect of the rotation direction; said lamellae (561) may be complemented by others arranged in planes transversal to the roller axis (51,52, 53,54), or in other directions, this cleaning roller assembly comprises:

Exterior cleaning rollers (51,52) which are located at the front and rear edges of the casing;

Interior cleaning rollers (53,54) which are located inside the casing, between the drive belts or between the lateral elements (11) which sustain these;

The front rollers (51,53) are driven by means of a single motor which transmits the movement to the motor axles of both of these by means of the corresponding transmission mechanism, but, within the scope of the invention, they could also be driven by means of independent motors; and the rear cleaning rollers (52,54) are driven by means of a single motor which transmits the movement to the motor axles of both of these by means of the corresponding transmission mechanism, but they could also be driven, within the scope of the invention, by means of independent motors;

In the ordinary cleaning operation, on flat surfaces or with fairly low obstacles, the front (exterior and interior) rollers and the rear (interior and exterior) rollers will rotate in opposite directions, dragging the dirt towards the centre of the device; there are nevertheless times at which it is necessary to get over an obstacle of some height; for this purpose the exterior rollers are arranged on a support (525) with an elastically hinged arm (526) which tends to be placed in the lower position, for cleaning, but which is able to rise against the elastic force when an obstacle forces it to do so; also in view of any change in position of the cleaning device, particularly through its forward or backward tilting, it has been seen that it is useful for the rear exterior roller also to be arranged on an elastically rotated arm (526); it has nevertheless been designed for the cleaning of smooth surfaces, especially walls, that the arm (526) can be secured to prevent any movement; a securing pin is enough to do this;

The rollers will normally rotate in opposite directions, dragging the dirt towards the suction zone; to assist in getting over obstacles, it is nevertheless designed for the rollers to be able to all turn in the same direction as the drive means;

The width of the interior rollers is thus limited by the width of the casing; it is nevertheless a requisite for the cleaning to be carried out at the maximum width of the devices, without a wall or any other similar obstacle being able to limit the lateral cleaning capacity; for this reason the exterior cleaning rollers (51,52) reach the required width on the outside, at the limit of or outside the width of the device; for this purpose they are fitted on respective central arms (526) which support these, and which have the corresponding transmission mechanisms, with the cleaning roller (51,52) formed of two separate portions and sustained only by its central part (by one end of each of the portions); in accordance with one option, the separate portions may be independently sustained, so that the corresponding arm (526) is independent for each side, and in the event of there being any type of hinge of said arm (526) the axis of the two portions could become out of alignment; said option is not nevertheless considered preferential due to its mechanical complexity, even though it is considered within the scope of the invention; as a general rule, the two front and rear arms are elastically hinged so that they can pivot on respective axles (521) located in the body of the casing (1); when an obstacle is reached the elastic retaining of the arm (526) which keeps this in a position aligned with the floor (as for the rest of the rollers) is overcome, so that the arm allows the cleaning roller (51,52) which this sustains to rise, thus preventing the cleaner from becoming jammed on said obstacle; in FIG. 9, one can see a configuration of the hinged arm (526) with elastic retention by means of a spring (527), the power shafts for the movement are represented and in a preferential embodiment the support (525) of the arm (526) normally held to just one of the lateral elements (11) of the structure;

the interior rollers (53,54) have a core made up of a single continuous rigid body, and their sheathing divided into portions and the drive mechanism is placed on at least one of their sides; on the other hand, the exterior rollers (51,52) are divided so that these have two external portions, with a central drive mechanism in the arms (526) which constitute the sole support of each of said portions;

The housing of the interior rollers (53,54) is made up of several portions, between which there are one or more support wheels, with movement linked to the roller on which these are located, or free in respect of this, in a less preferred embodiment; it is intended for the support wheels (539) of the interior rollers not to be aligned with the wheels and drive mechanisms for the exterior rollers, in which there is no exterior cleaning, and these are not aligned either with the support wheels (539) of the other of the interior rollers;

The exterior rollers also preferably have support wheels (539);

The casing (1) also comprises at least one pair of gripping turbines (4); the gripping turbines (4) take the water from the outside of the casing and drive this in normal direction (perpendicular) and in the opposite direction to the support surface of the rollers (normally horizontal); the greater the discharge force (flow, speed), the greater the adherence to the surface will be; in particular there are two turbines located on the longitudinal symmetry plane and symmetrically in respect of the transversal symmetry plane;

The structure also comprises, according to a preferred option, a suction turbine or pump (8) (represented in FIG. 4), independent and linked with the suction mouth (30); the suction turbine or pump (8) is set on the outside of the suction mouth (30), integrated in the cleaner, allowing independent operation with no need for any external suction source; it can be provided with filtration media or not;

The casing (1) comprises a suction mouth (30); in the event of this having to be connected to an external inlet with a suction tube, said suction mouth will be provided with rotating elements and with a rotation body at a 45° angle;

The casing (1) also comprises at least a light source (70) and a camera (80) for taking pictures;

The casing (1) is provided with a sealed connection plate or sealed connectors; the cleaner comprises a control and governing body; due to the sensitivity of the semi-conductors to radiation, it is intended for the control body to be placed outside the device, preferably outside the intense radiation zone, and joined to this from the outside (in the area around the pool) by means of connection cables; this control and governing body will provide remote control for each of the elements controlled, such as stop-start and speeds and direction of rotation of each of the motors, as well as the light, camera, turbines, etc.

The upper cover (1) holds a suction bell (150); in its upper portion it forms the suction mouth (30), and in the lower zone it forms a rectangular section (151) set between the interior rollers at the height of the geometrical plane joining their corresponding axes.

In this configuration, the drive and cleaning body (100) has a maximum width of roughly 32 cm and a length of roughly 41 cm, and has a floatation body roughly 90 cm long, which allows great manoeuvring capacity and can reach recesses which would be impossible for other devices due to their dimensions and structure.

To give the cleaner the required floatability to be able to move along a wall or sloping surface, normally from the top downwards, it has been designed for said cleaner to comprise a floatation body (200). The floatation body (200) is formed of a casing or housing (201) with at least one first sealed chamber, which can also be provided with an interior inflatable membrane. This first chamber is provided with inlet/outlet connections for filling/emptying and interior cleaning. This will normally be full of air, but in some applications, or to be used with a lighter body, it may be partly full of water, the rest being air, which means that the float force can be regulated. The floatation body (200) is provided with coupling arms (202) on both sides of one of its ends. These coupling arms (202) comprise at least two holes (203) or means of connection to other corresponding ones on the outer walls of the lateral elements (11). These arms will preferably hold the lateral walls by means of securing screws in all their holes. However, especially when used for cleaning sloping surfaces, the arms will be secured with a single screw on each side, allowing the floatation body to tilt (200) in respect of the drive and cleaning body (100), held by the coupling arms (202).

The floatation body comprises lateral impulsion turbines (204). In a preferential embodiment, the lateral impulsion turbines (204) are attached to the coupling arms (202), along with the first chamber (201). The activation of these turbines when the cleaner is in a state of weightlessness through the compensation of the weight with the corresponding floating force will enable a lateral displacement to a new cleaning position. The turbines for securing the cleaner body will return the cleaner to the surface of the wall so that the assembly has free travel in all degrees since it is provided with forward and reverse movements, rotation, gripping and withdrawing from the surface to be cleaned, and lateral displacement.

According to a preferential embodiment, the floatation body (200) also comprises a second chamber (205) with variable volume, provided with an interior inflatable membrane. Filling/emptying said second chamber (205) with air is done by means of a connection (206) to an external compressor. Depending on whether greater or lesser floatation of the cleaner is needed, the variable volume chamber will be totally empty, thus meaning that the effective weight of the cleaner will be the maximum or will be partly full, or totally full of air, and the effective weight will therefore be the minimum. The second chamber comprises at least one perforated wall, so that when the inner balloon inside this is filled (totally or partly) with air, the water that the volume of air displaces can be drained out. According to a particular embodiment, the first fixed volume chamber and the second variable volume chamber constitute a prismatic body to which the coupling arms (202) are linked; the chamber with variable volume is preferably located in the portion furthest from said prismatic body.

Furthermore, insofar as the floatation body (200) will when cleaning walls always be located at the top of the drive and cleaning body (100), it has been designed for the floatation body (200) to be provided in the portion furthest from said drive and cleaning body (100) with a scraper (210). The scraper is formed of a soft strip (211), normally made of rubber, arranged on a holding part (212); in accordance with a preferential embodiment this support is made up of a tube with circular section made of a light material and filled with injected foam, thus minimizing its density and constituting a further floating part. In a preferred embodiment, the holding part is set on one or more supports joined to the floatation body (200) which allow the scraper to take up different angular positions, modifying the distance to the wall in the same way in accordance with operating requirements.

What is claimed is:

1. A floor and wall cleaner, provided with a cleaning and drive body, which comprises:
    a casing made up of lateral elements joined together;
    a suction bell placed in said casing;
    a suction mouth at a top of the suction bell;
    a drive mechanism placed on both sides thereof, said drive mechanism including drive motors and corresponding transmission mechanisms, which are independent on each side, for driving said body,
    cleaning rollers including:
        assemblies of interior cleaning rollers, placed close to a center of a gap in the casing, and having a width roughly equal to a distance between the lateral elements of said casing, and
        assemblies of exterior cleaning rollers placed in a zone close to front and rear edges of the casing of the cleaner, and having a total width slightly greater than a width of said casing; and
    a floatation body provided with a coupling arrangement including coupling arms for coupling the floatation body to the casing, whereby the coupling arms are joined to the casing in an articulated and tilting mode, and being vertically aligned with a center of gravity of the cleaner in a wall cleaning position;
    wherein movement of front ones of the cleaning rollers is independent from movement of rear ones of the cleaning rollers as well as of the drive motors and relevant transmission mechanisms.

2. A floor and wall cleaner, according to claim 1, wherein the suction mouth is provided with a rotary element joined to the casing.

3. A floor and wall cleaner, according to claim 1, wherein the suction mouth is connected to an external source of suction.

4. A floor and wall cleaner, according to claim 3, further comprising a 45° rotation body with a lower element and an upper element in turn provided with a rotating mouth.

5. A floor and wall cleaner, according to claim 1, further comprising an independent external pump joined to the suction mouth.

6. A floor and wall cleaner, according to claim 1, wherein the casing also comprises a filter directly connected to an outlet of the pump.

7. A floor and wall cleaner, according to claim 1, wherein the interior cleaning rollers are continuous, with a discontinuous sheathing, and having a core made up of a single rigid body, and that the drive mechanism is placed on at least one of the edges.

8. A floor and wall cleaner, according to claim 1, wherein the exterior rollers are divided into two portions separated by a central drive mechanism, constituting a sole support for each of said portions.

9. A floor and wall cleaner, according to claim 1, wherein the exterior cleaning rollers are provided with at least one support wheel moving along with the roller on which these are located.

10. A floor and wall cleaner, according to claim 1, wherein the interior cleaning rollers are provided with at least one support wheel moving along with the roller on which these are located.

11. A floor and wall cleaner, according to claim 10, wherein the support wheels of the interior cleaning rollers are not aligned with a mechanism for driving the exterior cleaning rollers.

12. A floor and wall cleaner, according to claim 10, wherein the support wheels of front ones of the interior cleaning rollers are not aligned with support wheels of rear ones of the interior cleaning rollers.

13. A floor and wall cleaner, according to claim 1, wherein the cleaning rollers are made up of a core covered with a strip made of an elastic material constituting a cleaning brush, which comprises at least one set of lamellae set in a radial position on an outer surface thereof.

14. A floor and wall cleaner, according to claim 1, wherein at least one of:
   front ones of the exterior cleaning rollers and
   rear ones of the exterior cleaning rollers
are fitted on respective arms which are articulated in respect of structure constituting the cleaning and drive body, and
   a hinge is provided with an elastic arrangement for returning the cleaning rollers to a working position when this position has been altered by the presence of an obstacle.

15. A floor and wall cleaner, according to claim 1, further comprising at least one pair of turbines for adherence to a floor, which take water from outside the suction bell and expel the water outside perpendicularly to a support surface.

16. A floor and wall cleaner, according to claim 1, further comprising at least one light fixture.

17. A floor and wall cleaner, according to claim 1, further comprising a camera for taking pictures.

18. A floor and wall cleaner, according to claim 1, further comprising an electronic system for control and governance with sealed connections, placed outside the cleaner and joined to the cleaner by connection cables.

19. A floor and wall cleaner, provided with a cleaning and drive body, which comprises:
   a casing made up of lateral elements joined together;
   a suction bell placed in said casing;
   a suction mouth at a top of the suction bell;
   a drive mechanism placed on both sides thereof, said drive mechanism including drive motors and corresponding transmission mechanisms, which are independent on each side, for driving said body,
   cleaning rollers including:
      assemblies of interior cleaning rollers, placed close to a center of a gap in the casing, and having a width roughly equal to a distance between the lateral elements of said casing, and
      assemblies of exterior cleaning rollers placed in a zone close to front and rear edges of the casing of the cleaner, and having a total width slightly greater than a width of said casing;
   a floatation body provided with a coupling arrangement including coupling arms for coupling the floatation body to the casing, whereby the coupling arms are joined to the casing in an articulated and tilting mode, and being vertically aligned with a center of gravity of the cleaner in a wall cleaning position; and
   at least a pair of turbines with lateral angle discharge.

20. A floor and wall cleaner, according to claim 19, wherein the pair of laterally angled discharge turbines are placed in the floatation body for coupling to the casing.

21. A floor and wall cleaner, provided with a cleaning and drive body, which comprises:
   a casing made up of lateral elements joined together;
   a suction bell placed in said casing;
   a suction mouth at a top of the suction bell;
   a drive mechanism placed on both sides thereof, said drive mechanism including drive motors and corresponding transmission mechanisms, which are independent on each side, for driving said body,
   cleaning rollers including:
      assemblies of interior cleaning rollers, placed close to a center of a gap in the casing, and having a width roughly equal to a distance between the lateral elements of said casing, and
      assemblies of exterior cleaning rollers placed in a zone close to front and rear edges of the casing of the cleaner, and having a total width slightly greater than a width of said casing; and
   a floatation body provided with a coupling arrangement including coupling arms for coupling the floatation body to the casing, whereby the coupling arms are joined to the casing in an articulated and tilting mode, and being vertically aligned with a center of gravity of the cleaner in a wall cleaning position;
   wherein the floatation body comprises a first fixed volume chamber, which is one of:
      sealed and
      provided with an inflatable membrane inside the first fixed volume chamber, and
   one of said first fixed volume chamber and said inflatable membrane being one of:
      totally filled with air and
      having air mixed with a certain amount of water.

22. A floor and wall cleaner, according to claim 21, wherein the floatation body comprises a second chamber with variable volume, provided with an inflatable membrane with an external compressor, said second chamber having at least one perforated wall for draining off water found in said second chamber when the membrane swells up.

23. A floor and wall cleaner, according to claim 22, wherein the first fixed volume chamber and the second variable volume chamber are placed in a single prismatic body, provided with said coupling arms for coupling to the cleaning and drive body.

24. A floor and wall cleaner, according to claim 23, wherein the prismatic body constitutes the floatation body and is provided with a scraper in a zone furthest from the coupling arms.

25. A floor and wall cleaner, according to claim 24, wherein the scraper is made up of a tubular shaped holding part provided with a strip of soft material, said tubular shaped holding part being made of a light material and a light filling of injected foam, constituting an additional floatation element.

26. A floor and wall cleaner, according to claim 25, further comprising at least one support for the holding part linked to the floatation body, which allows said holding part and corresponding scraper to take up different angular positions.

* * * * *